United States Patent
Barbezat et al.

(10) Patent No.: US 7,141,271 B2
(45) Date of Patent: Nov. 28, 2006

(54) METHOD FOR PRODUCING A SOLID CERAMIC FUEL CELL

(75) Inventors: Gérard Barbezat, Opfikon (CH); Robert Fleck, Adelsdorf (DE); Thomas Jansing, Erlangen (DE); Michael Loch, Wehr (DE)

(73) Assignee: Siemens Power Generation, Inc., Orlando, FL (US)

( * ) Notice: Subject to any disclaimer, the term of this patent is extended or adjusted under 35 U.S.C. 154(b) by 474 days.

(21) Appl. No.: 10/362,831

(22) PCT Filed: Aug. 23, 2001

(86) PCT No.: PCT/EP01/09760

§ 371 (c)(1),
(2), (4) Date: Aug. 5, 2003

(87) PCT Pub. No.: WO02/19455
PCT Pub. Date: Mar. 7, 2002

(65) Prior Publication Data
US 2004/0076866 A1    Apr. 22, 2004

(30) Foreign Application Priority Data
Aug. 30, 2000    (EP) .................................. 00118769

(51) Int. Cl.
*B05D 5/12* (2006.01)
*H01M 8/12* (2006.01)

(52) U.S. Cl. ........................................ 427/115; 429/30
(58) Field of Classification Search ................ 427/115; 429/30
See application file for complete search history.

(56) References Cited

U.S. PATENT DOCUMENTS

| 5,391,440 A | * | 2/1995 | Kuo et al. ............... 427/115 X |
| 5,527,633 A | * | 6/1996 | Kawasaki et al. ............ 429/30 |
| 5,853,815 A | | 12/1998 | Muehlberger ............... 427/446 |
| 6,066,364 A | | 5/2000 | Blass et al. ................ 427/2.01 |

FOREIGN PATENT DOCUMENTS

| DE | 196 09 418 | 3/1996 |
| EP | 0 588 597 A | 3/1994 |
| FR | 2 729 400 | 7/1996 |
| JP | 63 00450 A | 6/1988 |
| JP | 08 293310 A | 3/1997 |
| JP | 10 294115 A | 2/1999 |
| JP | 10 255825 A | 12/1999 |

OTHER PUBLICATIONS

English translation of JP 10-255,825 from the Japanese Patent Office website (document date: Sep. 1998).*
English translation of JP 10-294,115 from the Japanese Patent Office website (document date: Nov. 1998).*

(Continued)

*Primary Examiner*—Stephen J. Kalafut

(57) ABSTRACT

According to a method for producing a solid ceramic fuel cell, a solid electrolyte layer is gas-tightly deposited on an electrode inside a coating chamber, using a plasma spraying technique. The pressure inside the coating chamber is set at less than approximately 15 mbar for this purpose. A coating material is powder form, preferably with a particle diameter of significantly less than 10 μm, is finely dispersed in the plasma jet in such a way that the individual particles are isolated from each other when they meet the electrode. This enables a very homogenous and impervious solid electrolyte layer to be deposited.

24 Claims, 2 Drawing Sheets

OTHER PUBLICATIONS

Database Inspec 'Online! Institute of Electrical Engineers, Stevenage, GB; Lang M et al.: "Characterisation of plasma sprayed thin film SOFC for reduced operating temperatures", Zussammenfassung & Fourth European Solid Oxide Fuel Cell Forum Proceedings, vol. 1, pp. 231-240, Jul. 2000.

G Schiller et al.: "Development of plasma sprayed components for a new SOFC design", Proceedings of the Fifth International Symposium on Solid Oxide Fuel Cells, Bd. 97, Nr. 18, pp. 635-644, Jun. 1997.

Heiko R. Gruner et al.: "SOFC Elements by Vacuum-Plasma-Spraying (VPS)", First European Solid Oxide Fuel Cell Forum Proceedings, Bd. 2, pp. 611-616, Oct. 1994.

Heiko R. Gruner et al.: "The Monolithic VPS-Fabricated SOFC", Proceedings of $2^{nd}$ European Solid Oxide Fuel Cell Forum, Bd. 1, pp. 261-267, May 1996.

Rudolf Henne: "Potential of Vacuum Plasma Spraying for the Production of SOFC Components", Proceedsing of $1^{st}$ European Solid Oxide Fuel Cell Conference, Bd. 2, 1994, pp. 617-627, Oct. 1994.

Yoshida T. et al.: "Integrated Fabrication Process for Solid Oxide Fuel Cells Using Novel Plasma Spraying", Plasma Sources Science and Technology, IOP Publishing Ltd., Bd. 1, Nr. 3, pp. 195-201, Aug. 1992.

* cited by examiner

METHOD FOR PRODUCING A SOLID CERAMIC FUEL CELL

This application is the national phase under 35 U.S.C. § 371 of PCT International Application No. PCT/EP01/09760 which has an International filing date of Aug. 23, 2001, which designated the United States of America and which claims priority on European Patent Application number EP 00118769.9 filed Aug. 30, 2000, the entire contents of which are hereby incorporated herein by reference.

FIELD OF THE INVENTION

The invention generally relates to a process for producing a solid oxide fuel cell. Preferably, it relates to a process for producing one having a solid electrolyte layer arranged between two porous electrodes.

BACKGROUND OF THE INVENTION

A fuel cell generally comprises two electrodes, namely an anode and a cathode, between which an electrolyte layer is arranged. Oxygen is passed over the cathode surface and a fuel is passed over the anode surface. Ion exchange between the fuel and the oxygen takes place via the electrolyte layer, so that a voltage is formed between anode and cathode.

One of the crucial factors with regard to the efficiency of a fuel cell is the electrolyte layer. On the one hand, it must have a good ion conductivity and on the other hand, it needs to be substantially gas-impermeable, in order to prevent gas exchange between fuel and oxygen. Therefore, high demands are imposed on the electrolyte layer.

In what are known as solid oxide fuel cells (SOFCs), the anode and the cathode are formed from a porous ceramic material, between which a solid electrolyte layer is arranged. Solid oxide fuel cells with a planar geometry, in which the anode and cathode run substantially plane-parallel to one another, are known. In addition, a cylindrical or tubular configuration is also known. A tubular fuel cell of this type comprises a porous ceramic inner cylinder as the cathode, to which the electrolyte layer is applied, followed by the anode as a casing. To produce electrical connection to the cathode, there is what is known as an interconnector, which is directly connected to the cathode, the electrolyte layer and the anode being interrupted in the region of the interconnector.

A large number of processes for applying the solid electrolyte layer are known. For example, DE 196 09 418 C2 discloses the application of a suspension which contains solid fractions of the solid electrolyte material to a planar electrode. Excess solvent is removed by reducing the pressure on the opposite side of the porous electrode from the suspension. The suspension has coarse and fine solid fractions, the coarse solid fractions initially blocking the pores in the electrode and ensuring good bonding between the electrolyte layer and the electrode. The fine fractions are then deposited on the coarse fractions. The solid layer is dried and then sintered in order to form the solid electrolyte layer. This coating process requires subsequent sintering of the electrolyte layer at a high temperature.

Moreover, DE 196 09 418 C2 discloses that it is known to produce the electrolyte layer by electrophoresis or by tape casting.

An EVD (EVD: electrochemical vapor deposition) process for applying the electrolyte layer is known from the article "Status of Solid Oxide Fuel Cell Technology" by S. C. Singhal, taken from: High Temperature Electrochemistry: Ceramics and Metals, 17th Risø International Symposium und Material Sience, Roskilde, Denmark, September 1996. This process is also suitable for complex surface geometries, in particular for the curved surfaces which are present in a cylindrical or tubular fuel cell. However, the EVD process is very expensive and complex.

It is known from the article that both the electrolyte layer and the interconnector and the anode are usually applied by the EVD process. The article deals with the problem of replacing the expensive EVD process with other coating systems. While new coating processes, for example plasma-coating processes, are proposed for the interconnector and the anode, the EVD process continues to be envisaged for the electrolyte layer in order to ensure that a sufficiently high quality is achieved.

One problem with the electrolyte layer is considered to reside in particular in the gastightness required. The solid electrolyte layer cannot generally be formed to be sufficiently gastight with a conventional plasma coating process, which is significantly less expensive than the EVD process. A plasma coating process usually applies a molten or pasty coating material, which then solidifies, to the substrate to be coated within a relatively small spray spot with a diameter of up to 4 cm. In the case of large-area components, for example in the case of the known tubular fuel cells, the small size of the spray spot means that the coating has to be applied in a plurality of tracks.

A plasma coating process of this type throws up in particular two serious problems for the formation of a solid electrolyte layer: firstly, the molten material shrinks as it solidifies, so that a porosity which corresponds to the degree of shrinkage is formed in the solid electrolyte layer. Therefore, a gastight layer cannot be achieved. Secondly, a process of this type is scarcely able to achieve homogeneous formation of the solid electrolyte layer with a uniform thickness, since the individual tracks overlap at their boundary regions. The fluctuations in thickness in the region of the solid electrolyte layer significantly reduce the efficiency of a fuel cell, since the ion conductivity across the solid electrolyte layer is adversely affected.

On account of the significant cost benefits of a plasma coating process, for example compared to the EVD process, more recent developments also aim to use plasma coating processes for the solid electrolyte layer. This is shown, for example, by the scientific article by Rudolf Henne "Potential of Vacuum Plasma Spraying for the Production of SOFC Components" and the article by Heiko R. Gruner et al. "SOFC Elements by Vacuum-Plasma-Spraying (VPS)", both included in "Proceedings of first European Solid Oxide Fuel Cell Conference", Lucerne, Switzerland, October 3 to 7, 1994, Volume 2, pages 617 to 627 and pp. 611 to 616, respectively. A common feature of both these articles is that they propose a vacuum plasma process, with a pressure of approximately 100 mbar being established in the coating chamber.

FR 2 729 400 A1 and the patent abstract to the Japanese patent application 63000450 respectively propose pressures in the range from 0.1 to 20 mbar and 10 to 100 torr (13 to 130 mbar).

However, even with these known plasma-coating processes, it is impossible to achieve a high-quality solid electrolyte layer which has the quality of a solid electrolyte layer produced using the EVD process.

SUMMARY OF THE INVENTION

An embodiment of the invention is based on an object of providing an inexpensive and simple process for producing a solid oxide fuel cell with a high efficiency.

According to an embodiment of the invention, the object may be achieved by a process for producing a solid oxide fuel cell having a solid electrolyte layer arranged between two porous electrodes, the electrolyte layer being applied in gastight form to one of the electrodes by means of a plasma spraying process inside a coating chamber. A pressure of less than approximately 15 mbar, and in particular a pressure in the range between 1 and 5 mbar, is established in the coating chamber. Individual particles of a coating material are entrained in a plasma jet and are thinly distributed in the plasma jet in such a manner that they are applied to the substrate (electrode) in substantially isolated form.

A plasma-coating process of this type forms a high-quality solid electrolyte layer, which is quite comparable to a solid electrolyte layer produced by means of an EVD process, and in particular is very highly gastight. In this context, it is essential that the individual particles be extremely thinly distributed in the plasma jet and be applied in isolated form. The layer is therefore produced by "punctiform" application of individual particles. The individual particles are distributed finely and in dispersed form in the plasma jet.

In this context, the term "punctiform" is understood as meaning the locally limited application of coating material, specifically delimiting the process with respect to the application of a dense coating material in conventional processes. The punctiform application is essential for the formation of a layer with a very low porosity, since during cooling each individual particle solidifies in a substantially isolated way and therefore also shrinks in an isolated way. The free space (porosity) which results from the shrinkage of the individual particle is closed up by particles which subsequently impinge on the surface and in turn solidify in a substantially isolated way. The isolated solidification therefore leads to the porosity which inevitably occurs during the process being filled up by subsequent coating particles, so that a dense layer is formed.

The isolated application is assisted by the low pressure in the coating chamber, which allows a relatively wide plasma jet. The widening of the plasma jet results in a very low material surface density for the same proportion of coating material (particle concentration) in the plasma jet per unit area of the substrate to be coated and makes it possible to achieve a very large coating area. The coating material is therefore applied very thinly, with the result that a low porosity is achieved. At the same time, a very large area of the surface to be coated is covered, so that single-track application without overlap areas or application with only a few overlap areas becomes possible.

If overlap areas are required, these are not critical at least on account of the thin application in terms of their overall thickness. Furthermore, the low pressure in the coating chamber has the advantageous effect that interaction between the individual particles of the plasma jet and the surroundings is substantially prevented, and therefore a good ion conductivity can be achieved. Moreover, the low pressure indicates that there are few instances of the individual particles colliding with one another.

A coating process of this type can be carried out, for example, on the basis of the plasma spraying process described in U.S. Pat. No. 5,853,815. In that document, the process disclosed is referred to as an LPPS (low pressure plasma spraying) thin-film process. In this case, a very low pressure, which is lower than the pressure range of approximately 30 mbar which is usually employed in a conventional LPPS process, is established in the coating chamber. In this process, a considerable temperature difference is established between the interior of a plasma gun which is used and the outside space. The high pressure difference helps the jet to widen.

To produce a continuous, i.e. closed layer on the electrode, it is preferable for the latter to be covered a number of times by the plasma jet. Therefore, a plurality of passes are carried out by the plasma jet, and the "punctiform" coating which takes place in the process closes up the shrinkage porosity between the individual coating spots in a particularly advantageous way. The speed at which the plasma jet is passed over the electrode is therefore sufficiently high to ensure "punctiform" coating.

In order to form a particularly dense layer, the individual coating spots formed during one pass are so thinly distributed that the layer advantageously only becomes continuous after the plasma jet has passed over the electrode 20 to 60 times. The then continuous layer preferably has a layer thickness of 5 μm to 10 μm.

In an advantageous configuration, the overall layer thickness of the solid electrolyte layer is approximately 30 μm. After approximately 20–60 passes of the plasma jet, the "punctiform" coating produces a continuous layer with the abovementioned layer thickness of from 5 to 10 μm. Thus, between 60 and 400 passes are carried out to form the electrolyte layer.

If the coating is effected by application in tracks, the overlap regions of the individual layers are advantageously offset with respect to one another, so that a homogeneous overall thickness of the solid electrolyte layer is produced.

On the electrode, the plasma jet preferably has a jet diameter of between 30 and 50 cm, in particular a jet diameter of 40 cm. Compared to a conventional process with a plasma jet diameter of typically 4 cm. Thus, the plasma jet area is increased by a factor of 100.

To form a particularly dense layer, a pulverulent coating material with a mean particle diameter of less than 20 μm is introduced into the plasma jet. It is in this case preferable for the mean particle diameter to be less than 10 μm. The preferred particle diameter is well below 10 μm. In the present context, the term mean particle diameter is understood as meaning what is known as the $D_{50}$ value, which denotes that 50% of the particles have a diameter of less than, for example, 10 μm (for a mean particle diameter of 10 μm). The small particle diameters allow considerable melting of the individual particles in the plasma jet.

The plasma-coating process preferably produces an electrolyte layer which has a leak rate of less than approximately $10*10^{-4}$ mbar l/sec/m². In particular, the leak rate is below $2.3*10^{-4}$ mbar l/sec/m². A leak rate of this type is therefore comparable to that which can be achieved by use of an EVD process. Therefore, a solid electrolyte layer of the same good quality can be formed using the plasma coating process, which is highly expedient compared to an EVD coating.

According to a particularly preferred embodiment, the density of the coating, and therefore its porosity, is set by varying the process parameters. This makes it possible to provide layers of different density using the same plasma-coating process. In particular, they may also be layers of different chemical composition. In this case, the pulverulent coating material which is introduced into the plasma jet is varied.

It is preferable for the density to be set by selecting the mean particle size. The other process parameters, in particular the low pressure in the coating chamber, therefore remain substantially identical. To produce a porous layer, by way of example particles with a mean particle diameter of >10 μm and in particular with particle diameters in the region of 45 μm are used. Such large particles scarcely melt or melt only slightly. Overall, it is possible to establish a porosity of between approximately 0 and 10%, based on the volume of the layer, by selecting the particle size. The process therefore enables a plurality of layers of the solid oxide fuel cell to be produced in a simple way.

It is preferable for an interconnector to be applied as a further layer by way of the plasma-spraying process. An interconnector of this type is generally provided in tubular fuel cells and is used for connection of the cathode, which is cylindrically surrounded by the anode. The interconnector is conductively connected to the cathode.

It is also preferable for at least one of the porous, solid oxide electrodes to be produced by use of the plasma spraying process. For this purpose, in particular the particle diameters mentioned above, in the region of 45 μm and above, are used. The advantage of the considerable jet widening in the plasma coating process and the build-up from layers produced in "punctiform" fashion continues to apply with regard to the formation of the porous electrode. The size of the individual particles, which are scarcely melted, indicates that cavities which form the porosity remain between the individual particles.

According to a particularly expedient configuration, the process parameters are varied during the coating. As a result, it is possible to apply different layers in a quasi-continuous coating operation. In particular, it is possible to apply layers which have a gradient in terms of the chemical composition and/or the porosity. Therefore, the process makes it possible to use a continuous coating process to produce almost the entire fuel cell, comprising two electrodes, the solid electrolyte layer and the interconnector, if the process is carried out in a suitable way.

The process is suitable in particular for a fuel cell which is designed as a tubular hollow body.

BRIEF DESCRIPTION OF THE DRAWINGS

An exemplary embodiment of the invention is explained in more detail below with reference to the drawings, in which, in each case in diagrammatic form.

DETAILED DESCRIPTION OF THE PREFERRED EMBODIMENTS

Figure 1:
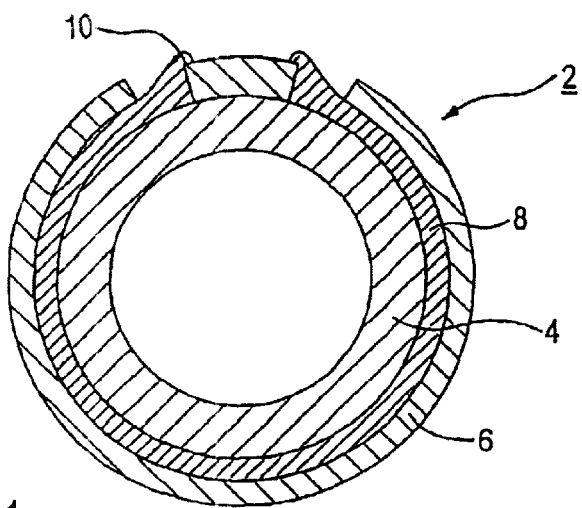
FIG. 1 shows a cross-sectional view through a tubular fuel cell.

In accordance with FIG. 1, a solid oxide, tubular fuel cell 2 includes a first electrode, which is referred to as cathode 4, and a second electrode, which is referred to as anode 6. The cathode 4 and the anode 6 are designed as cylinders arranged concentrically with respect to one another and consist of a porous ceramic material. A fuel cell 2 of this type with solid oxide electrodes is also known as an "SOFC fuel cell" (solid oxide fuel cell). Air or oxygen is passed through the inner tubular cathode 4, while a fuel, for example hydrogen, is guided past the anode 6 surrounding the cathode 4. The cathode 4 is also known as the air electrode and the anode 6 as the fuel electrode. A solid electrolyte layer 8 is arranged between the cathode 4 and the anode 6.

On the one hand, the solid electrolyte layer 8 has to be gastight, in order to prevent contact between the air and the fuel via the porous electrodes 4, 6. At the same time, the solid electrolyte layer 8 has to have a good ion conductivity, so that when the fuel cell is operating ions can migrate between the cathode 4 and the anode 6 in order to build up a voltage. To achieve a good ion conductivity between the two electrodes 4, 6, it is preferable for a special interlayer to be placed between the solid electrolyte 8 and the anode 6.

Neither the solid electrolyte layer 8 nor the anode 6 form a complete ring. Rather, they have an opening in the ring, in which what is known as an interconnector 9 is arranged and is directly connected in an electrically conductive manner to the cathode 4. The cathode 4 on the inner side can be electrically connected via the interconnector 9.

To achieve the highest possible efficiency of the fuel cell 2, high demands are imposed on the solid electrolyte layer 8 in terms of its gastightness and its ion conductivity. Therefore, only processes which are able to produce both a dense solid electrolyte layer 8 and a very homogenous solid electrolyte layer 8 with a constant layer thickness are suitable for application of the solid electrolyte layer 8. To satisfy these demands, the solid electrolyte layer 8 has usually been applied by means of the expensive EVD coating process (EVD: electron vapor deposition).

Figure 2:
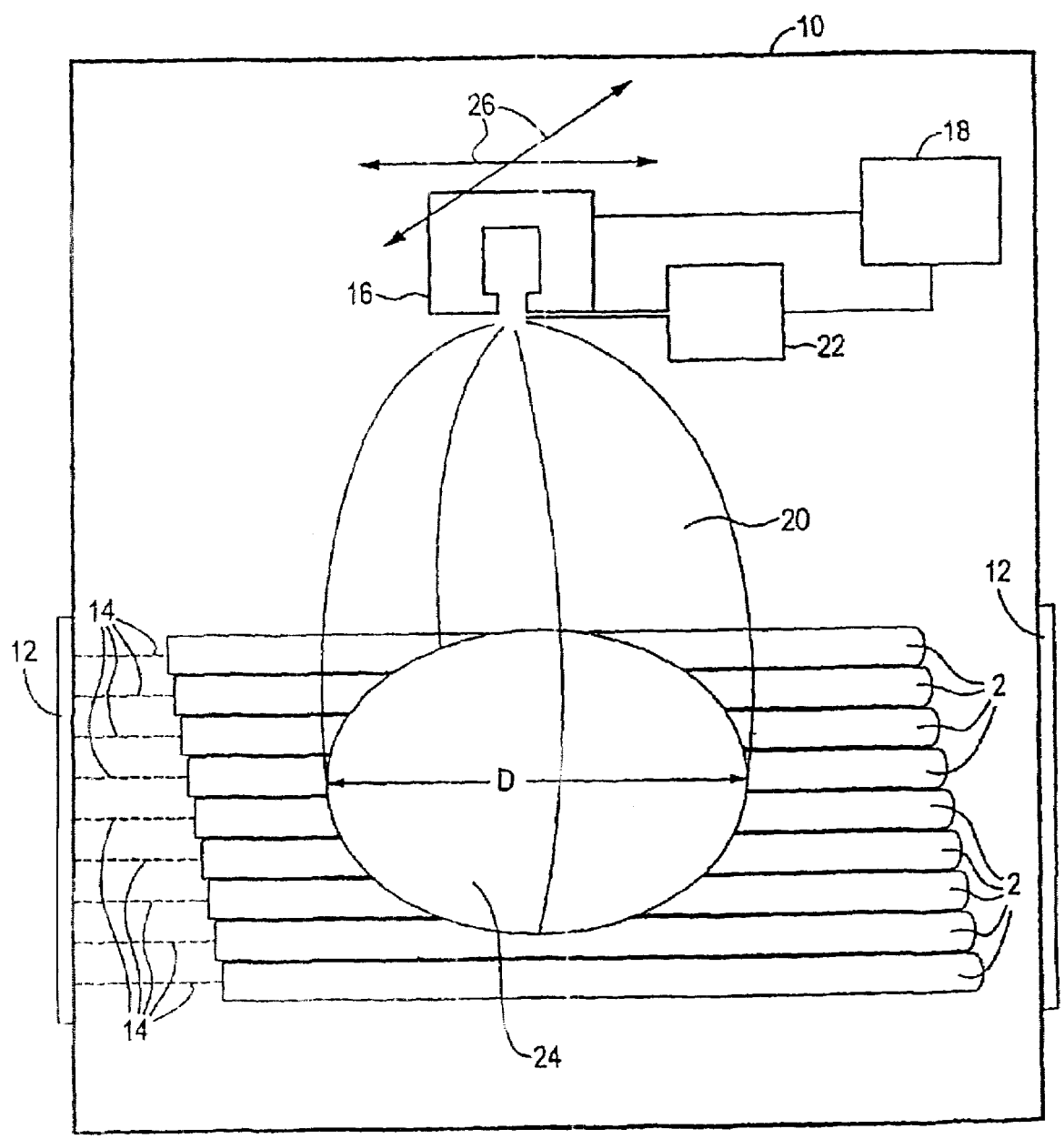
FIG. 2 shows a structure for carrying out the plasma coating process.

The basic structure for carrying out a special plasma spraying process, known as the LPPS thin-film process, is illustrated in FIG. 2. A multiplicity of fuel cells 2 which are to be coated are arranged in a coating chamber 10. These fuel cells 2 are introduced into and discharged from the coating chamber 10 via locks 12. Each individual fuel cell 2 can be rotated about an axis of rotation 14, which is indicated by dashed lines, in order to enable them to be coated uniformly and on all sides. What is known as a plasma gun 16 is arranged in the coating chamber 10 in order to carry out the plasma coating process. A plasma is usually produced in this plasma gun.

To control and supply the plasma gun 16, there is a control and supply unit 18 which is connected to the plasma gun 16. A powder as coating material is preferably introduced into the plasma jet 20 produced in the plasma gun 16 from a powder source 22, preferably directly at the outlet of the plasma gun 16. The control and supply unit 18 is connected to the powder source 22 and controls the rate at which the powder is fed into the plasma jet 20.

Conventional plasma coating processes are unsuitable for applying the solid electrolyte layer 8, since they do not allow either a sufficient density or a constant layer thickness of a large-area coating to be achieved. To form a high-quality solid electrolyte layer 8, a pressure of less than 15 mbar, and in particular less than 5 mbar, is established in the coating chamber 10. At the same time, the powder feed rate is selected in such a manner that the individual powder particles strike the surface to be coated in isolated form.

On account of the low pressure in the coating chamber, the plasma jet 20 widens out very considerably after it leaves the plasma gun 16. This assists the very fine, dispersed distribution of the powder over the coating surface 24. In the case of the thin-film process, the coating surface 24 typically has a jet diameter D of approximately 40 cm. As a result, large areas can be homogeneously coated with very thin layers.

Solid electrolyte material is used as powder from the powder source 22 for the application of a solid electrolyte layer 8. To produce a sufficiently dense layer, a powder with a mean particle diameter of less than 20 µm is used. In particular, particle diameters of less than 10 µm are used.

The considerable beam widening, caused by the low pressure in the coating chamber, the appropriate powder feed rate and the fine particles, advantageously lead to an extremely dense solid electrolyte layer being formed. Its leak rate is typically less than $2.3*10^{-4}$ mbar l/sec/cm$^2$ and is therefore comparable to the leak rate which can be achieved by use of the EVD process.

The dispersed distribution of the fine particles over the coating surface 24 is crucial to achieving such a low leak rate. The individual particles strike the surface which is to be coated in, as it were, isolated form, without forming lumps (clusters). On account of their small diameter, the particles have been partially melted in the plasma jet and are in predominantly molten form. After they have struck the surface, they solidify, with their volume being reduced in the process. In conventional processes, in which the particles are not applied to the surface to be coated in dispersed form, but rather in large numbers simultaneously as a pasty material, this shrinkage on solidification leads to a porosity being formed and prevents a dense layer from being formed. Although the individual particles also shrink in the plasma spraying process according to the invention, the open volumes produced by the shrinkage are closed up tightly by particles which subsequently strike the surface.

To achieve uniform coating of the entire fuel cell 2, the plasma gun 16 is arranged in such a manner that it can move in the directions indicated by the arrows 26 in the coating chamber 10. At the same time, the fuel cells 2 are rotated, so that homogenous and uniform application is achieved.

It has been found that particularly good results can be achieved with a pressure of 1.5 mbar in the coating chamber 10, a plasma gas flow rate of 120 SLPM (standard liters per minute) and a powder delivery rate of 80 g/min. The plasma gas used is in particular argon.

To form the solid electrolyte layer 8, a plurality of individual layers are successively formed by "punctiform" coating (each particle strikes the surface to be coated separately in a pasty state, shrinks separately before being struck by another particle). This is done until the desired total layer thickness of the solid electrolyte layer of approximately 30 µm is reached.

A critical advantage of the process resides in the fact that the properties of the coating applied can be varied within a wide range by varying the process parameters. This process is therefore suitable not only for the application of the solid electrolyte layer 8 but also, in particular, for the application of the interconnector 9, which in particular is also formed to be gastight. For application of the interconnector 9, a suitable coating material for the interconnector 9 is introduced into the powder source 22. It is advantageous for a plurality of powder sources 22—not shown in FIG. 2—holding different coating materials to be provided in the coating chamber 10.

However, in addition to the interconnector 9, it is also possible for the electrodes, in particular the anode 6, to be applied to the solid electrolyte layer 8 by means of the LPPS thin-film process. For this purpose, suitable ceramic powders are used as coating material. Since the anode 6 has to be porous, suitable ceramic powders with particle diameters of in particular greater than 45 µm are used. In general, a porosity of up to 10%, based on the volume of the coating, can be achieved in the layer forming by suitable selection of the particle size. This is attributable to the fact that large particles do not melt or only melt incompletely in the plasma jet 20 and are therefore applied next to one another as small balls, as it were, with cavities included between them. The process described is therefore particularly advantageously suitable for use in the field of fuel cells 2, since the different coatings for a solid oxide fuel cell 2, in particular a tubular solid oxide fuel cell 2, can be carried out quickly and inexpensively using a single process.

Figure 3:
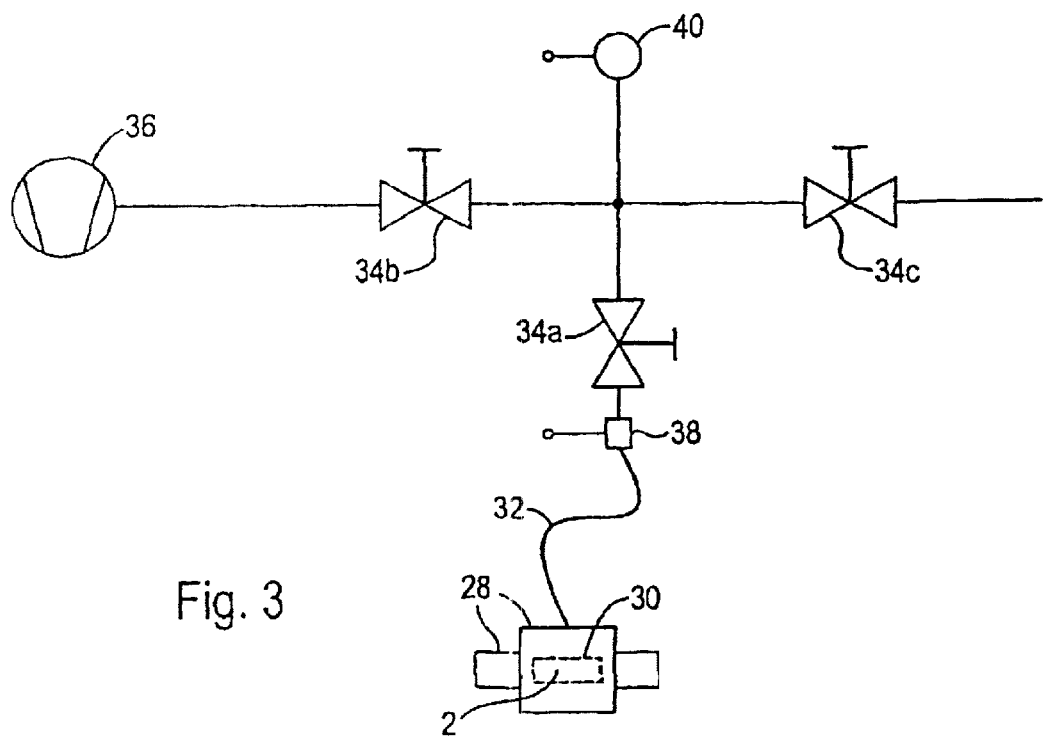
FIG. 3 shows a structure for determining the leak rate of the coating applied.

FIG. 3 shows the structure used to determine the leak rate of the coating applied. In accordance with DIN 28402, the pV flow of a gas through the coating is determined in order to establish the leak rate $q_L$. A specific differential pressure Δ is applied between the outer side and the inner side of the coating. The leak rate $q_L$ is determined according to the following formula:

$$q_L = dp/dt * V,$$

where dp is the pressure rise or pressure drop in the measurement time dt in the volume V.

To determine the leak rate $q_L$, the fuel cell 2 to be tested is introduced into a special adapter 28. The adapter 28 has a window 30 with a defined area and completely seals off the fuel cell 2 with respect to the environment, apart from the window 30. Therefore, the outer layer of the fuel cell 2 is in contact with the ambient pressure via the window 30. Air is pumped out of the interior of the fuel cell 2 via a first valve 34a and a second valve 34b via a pump line 32, and a subatmospheric pressure is generated. For this purpose, a pump 36 is provided. When a set subatmospheric pressure is reached, the valves 34a, 34b are closed. Then, the temporal curve of the pressure rise on the basis of the leak area defined by the window 30 is recorded by means of a pressure gauge 38. This pressure rise is transmitted from the pressure gauge 38 to an evaluation unit 40, where it is evaluated. A further valve 34 is provided, in order to vent the individual lines after the measurement cycle has ended.

To determine the leak rate $q_L$, the procedure is as follows: the pressure rise is measured over a measurement time dt of 30–600 sec. The differential pressure Δ is 1 bar, the measurement takes place at room temperature and the test gas is air. With a measurement structure of this type, a leak rate of less than $2.3*10^{-4}$ mbar l/sec/cm$^2$ is achieved for a solid electrolyte layer which has been applied using the process described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a solid oxide fuel cell, including a solid electrolyte layer arranged between two porous electrodes, comprising:

applying the solid electrolyte layer in gastight form to one of the electrodes via a plasma-spraying process in a coating chamber in which the pressure is less than 15 mbar, wherein individual particles of a coating material are entrained in a plasma jet, and wherein the particles are thinly distributed in the plasma jet in such a manner that they are applied to the one of the electrodes in substantially isolated form.

2. The process as claimed in claim 1, further comprising:

producing a continuous layer after the plasma jet has passed over the electrode a plurality of times.

3. The process as claimed in claim 2, wherein the layer is continuous after the plasma jet has passed over the electrode about 20 to 60 times.

4. The process as claimed in claim 1, wherein the total layer thickness of the solid electrolyte layer is between 5 µm and 30 µm.

5. The process as claimed in claim 1, wherein the plasma jet on the electrode includes a jet diameter of between 30 and 50 cm.

6. The process as claimed in claim 1, wherein a pulverulent coating material with a mean particle diameter of less than 20 µm is introduced into the plasma jet.

7. The process as claimed in claim 1, wherein the leak rate of the solid electrolyte layer is less than $10*10^{-4}$ mbar l/sec/cm².

8. The process as claimed in claim 1, wherein the density of the coating is set by varying the process parameters.

9. The process as claimed in claim 8, wherein the density is set by selecting the mean particle size.

10. The process as claimed in claim 1, further comprising: applying an interconnector as a further layer via the plasma-spraying process.

11. The process as claimed in claim 1, wherein at least one of the electrodes is produced via the plasma-spraying process.

12. The process as claimed in claim 1, wherein the process parameters are varied during the coating.

13. The process as claimed in claim 1, wherein the fuel cell is designed as a tubular hollow body.

14. The process as claimed in claim 3, wherein the layer has a layer thickness of 5 µm to 10 µm.

15. The process as claimed in claim 1, wherein the total layer thickness of the solid electrolyte layer is between 5 µm and 30 µm.

16. The process as claimed in claim 1, wherein the total layer thickness of the solid electrolyte layer is between 5 µm and 30 µm.

17. The process as claimed in claim 4, wherein the plasma jet on the electrode includes a jet diameter of 40 cm.

18. The process as claimed in claim 2, wherein the plasma jet on the electrode includes a jet diameter of between 30 and 50 cm.

19. The process as claimed in claim 3, wherein the plasma jet on the electrode includes a jet diameter of between 30 and 50 cm.

20. The process as claimed in claim 1, wherein a pulverulent coating material with a mean particle diameter of less than 10 µm is introduced into the plasma jet.

21. The process as claimed in claim 1, wherein the leak rate of the solid electrolyte layer is less than $2.3*10^{-4}$ mbar l/sec/cm².

22. A method for producing a solid oxide fuel cell, including a solid electrolyte layer arranged between two porous electrodes, comprising:

applying the solid electrolyte layer in gastight form to one of the electrodes via a plasma-spraying process in a coating chamber in which the pressure is less than 15 mbar, wherein particles of a coating material are dispersed in the plasma jet in such a manner that they are applied to the one of the electrodes in substantially isolated form.

23. The process as claimed in claim 22, further comprising:

producing a continuous layer by passing the plasma jet over the at least one electrode a plurality of times.

24. The process as claimed in claim 23, wherein the layer is continuous after the plasma jet has passed over the electrode about 20 to 60 times.

* * * * *